United States Patent
Yazawa et al.

(10) Patent No.: US 7,181,828 B2
(45) Date of Patent: Feb. 27, 2007

(54) METHOD FOR MANUFACTURING PERPENDICULAR MAGNETIC RECORDING HEAD

(75) Inventors: Hisayuki Yazawa, Niigata-ken (JP); Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 337 days.

(21) Appl. No.: 10/913,200

(22) Filed: Aug. 6, 2004

(65) Prior Publication Data

US 2005/0039324 A1    Feb. 24, 2005

(30) Foreign Application Priority Data

Aug. 21, 2003   (JP)   ............... 2003-296977

(51) Int. Cl.
*G11B 5/187*   (2006.01)
*B44C 1/22*    (2006.01)

(52) U.S. Cl. ............... 29/603.12; 29/603.15; 29/603.16; 29/603.18; 216/22; 216/39; 360/122

(58) Field of Classification Search ............. 29/603.12, 29/603.13, 603.15, 603.16, 603.18, 603.23; 216/22, 38, 39, 72; 360/122, 125
See application file for complete search history.

(56) References Cited

U.S. PATENT DOCUMENTS 6,760,966 B2 *  7/2004  Wang et al. ......... 29/603.13 X

FOREIGN PATENT DOCUMENTS

| JP | 59-177376 | * 10/1984 | ............... 216/22 X |
|---|---|---|---|
| JP | 09-16907 | 1/1997 | |
| JP | 2001-526440 | 12/2001 | |
| JP | 2002-92820 | 3/2002 | |
| JP | 2002-092820 | 3/2002 | |
| JP | 2002-157706 | 5/2002 | |
| JP | 2003-006813 | 1/2003 | |
| WO | 99/28903 | 6/1999 | |

OTHER PUBLICATIONS

Yoda et al., "Self-Alignment Trench Pole Writer", IEEE Transactions on Magnetics, vol. 35, No. 5, Sep. 1999, pp. 2535-2537.*
Notification of Refusal dated Nov. 28, 2006 for corresponding Japanese Patent Application No. 2003-296977.

* cited by examiner

*Primary Examiner*—A. Dexter Tugbang
(74) *Attorney, Agent, or Firm*—Brinks Hofer Gilson & Lione

(57) ABSTRACT

In a method for manufacturing a perpendicular magnetic recording head, a groove defined by the inner side surfaces of a first nonmagnetic layer and the top surface of a main magnetic pole layer is formed using the difference in etching rates for dry etching between the main magnetic pole layer and the first nonmagnetic layer. An auxiliary magnetic pole layer is formed on the groove with a nonmagnetic material layer disposed therebetween. A projection integrated with the auxiliary magnetic pole layer is formed in a recess of the nonmagnetic material layer on the groove. This projection extends toward the main magnetic pole layer.

6 Claims, 13 Drawing Sheets

//\*\*PAGE START\*\*//
METHOD FOR MANUFACTURING PERPENDICULAR MAGNETIC RECORDING HEAD

This application claims the benefit of priority to Japanese Patent Application No. 2003-296977, herein incorporated by reference.

BACKGROUND OF THE INVENTION

1. Field of the Invention

The present invention relates to methods for manufacturing a perpendicular magnetic recording head that records magnetic data on a recording medium such as a disc by applying a magnetic field perpendicularly onto a medium surface of the recording medium. In particular, the present invention relates to an easy method for manufacturing a perpendicular magnetic recording head that can record magnetic data in narrower tracks on the recording medium.

2. Description of the Related Art

FIG. 12 shows a magnetic recording head used in a perpendicular magnetic recording device. Perpendicular magnetic recording, in which a recording medium is magnetized perpendicularly to its medium surface, enables the recording of magnetic data at a higher density than longitudinal magnetic recording, in which a recording medium is magnetized longitudinally to its medium surface.

FIG. 12 is a sectional view of the magnetic head used in the perpendicular magnetic recording device. FIG. 13 is a front view of the magnetic head in FIG. 12. The sectional view of FIG. 12 is taken along dotted-chain line XII-XII in FIG. 13 in the direction of the arrows.

A magnetic head H is provided on a trailing side surface of a slider that floats or slides on a recording medium.

This magnetic head H includes a main magnetic pole layer 1 and a return path layer (auxiliary magnetic pole layer) 2 provided on the main magnetic pole layer 1. The main magnetic pole layer 1 and the return path layer 2 are composed of a ferromagnetic material.

An end surface 1a of the main magnetic pole layer 1 and an end surface 2a of the return path layer 2 are separated at the front surface of the magnetic head H by a predetermined distance. The main magnetic pole layer 1 and the return path layer 2 are magnetically connected by a magnetic connection 1b.

The main magnetic pole layer 1 and the return path layer 2 are separated by a nonmagnetic insulating layer 3 composed of an inorganic material such as $Al_2O_3$ and $SiO_2$. A coil layer 4 composed of a conductive material such as Cu is formed in this nonmagnetic insulating layer 3.

The end surface 1a of the main magnetic pole layer 1 has a sufficiently smaller area than the end surface 2a of the return path layer 2.

A magnetic flux $\phi$ is therefore concentrated at the end surface 1a of the main magnetic pole layer 1 to record magnetic data onto the opposite area of an outer hard film Ma of a recording medium M. The recording medium M is, for example, a disc, and includes the hard film Ma, which has high residual magnetization, and an inner soft film Mb having high magnetic permeability. The magnetic field $\phi$, which is generated from the main magnetic pole layer 1, passes through the soft film Mb to enter the return path layer 2.

The return path layer 2 has a projection 2b extending toward the main magnetic pole layer 1. This projection 2b can suppress the divergence of the magnetic flux $\phi$ passing from the main magnetic pole layer 1 to the return path layer 2 through the recording medium M. This magnetic head H can therefore clearly define the edges of recording tracks on the recording medium M to achieve narrower tracks for higher recording densities. Japanese Unexamined Patent Application Publication No. 2002-92820 discloses a perpendicular magnetic recording head of this type.

This publication, however, does not specifically disclose a method for manufacturing such a perpendicular magnetic recording head.

SUMMARY OF THE INVENTION

To solve the above problem, the present invention provides an easy method for manufacturing a perpendicular magnetic recording head that can generate and converge a magnetic field effectively to easily define a substantial recording track width within a predetermined range.

According to the present invention, a method for manufacturing a perpendicular magnetic recording head includes the following steps of:

(a) forming a main magnetic pole layer from a magnetic material;

(b) providing a first nonmagnetic layer on the sides and top of the main magnetic pole layer;

(c) polishing the top surface of the first nonmagnetic layer to form a planarized surface;

(d) trimming the top surfaces of the main magnetic pole layer and the first nonmagnetic layer by dry etching to form a groove defined by the inner side surfaces of the first nonmagnetic layer and the top surface of the main magnetic pole layer;

(e) depositing a nonmagnetic material layer on the first nonmagnetic layer and the main magnetic pole layer to form a recess of the nonmagnetic material layer on the groove; and (f) forming an auxiliary magnetic pole layer on the nonmagnetic material layer to form a projection in the recess, the projection being integrated with the auxiliary magnetic pole layer and extending toward the main magnetic pole layer.

The main magnetic pole layer, which is composed of a magnetic material, and the first nonmagnetic layer, which is composed of an insulating material, have different etching rates; as a result, the main magnetic pole layer is trimmed by dry etching higher than the first nonmagnetic layer.

When, therefore, the top surfaces of the main magnetic pole layer and the first nonmagnetic layer are trimmed by dry etching at step (d), the groove can be defined by the inner side surfaces of the first nonmagnetic layer and the top surface of the main magnetic pole layer.

After step (d), the auxiliary magnetic pole layer is formed on the groove with the nonmagnetic material layer disposed therebetween. As a result, the projection can be readily formed in the recess. This projection is integrated with the auxiliary magnetic pole layer and extends toward the main magnetic pole layer.

In the perpendicular magnetic recording head manufactured by the method according to the present invention, the projection, extending from the auxiliary magnetic pole layer toward the main magnetic pole layer, can suppress the divergence of a magnetic flux passing from the main magnetic pole layer to the auxiliary magnetic pole layer.

In addition, the projection is positioned in the recess of the nonmagnetic material layer; therefore, a magnetic flux passing from the main magnetic pole layer to the auxiliary magnetic pole layer is generated in the magnetic head. Thus, this magnetic head can suitably adjust the strength of a magnetic field generated from the main magnetic pole layer more easily than a known perpendicular magnetic recording head that simply enhances the magnetic field.

The magnetic recording head manufactured by the method according to the present invention can therefore generate and converge a magnetic field effectively and define the edges of recording tracks clearly on a recording medium to easily define a substantial recording track width within a predetermined range, thereby achieving narrower tracks for higher recording densities.

Preferably, the method according to the present invention further includes a step of (g) forming a second nonmagnetic layer on the top and sides of the main magnetic pole layer between steps (a) and (b), wherein, at step (b), the first nonmagnetic layer is provided on the sides and top of the second nonmagnetic layer; and at step (d), the top surfaces of the main magnetic pole layer, the second nonmagnetic layer, and the first nonmagnetic layer are trimmed by dry etching so that the top surfaces of the second nonmagnetic layer are disposed below the top surfaces of the first nonmagnetic layer.

If the second nonmagnetic layer is provided on the sides of the main magnetic pole layer as in the present invention, at step (d), the top surface of the main magnetic pole layer can easily be trimmed deeply and planarized to ensure the formation of the groove by the inner side surfaces of the first nonmagnetic layer and the top surface of the main magnetic pole layer.

The etching rate of the second nonmagnetic layer is preferably higher than that of the first nonmagnetic layer under the same etching conditions.

In the present invention, the second nonmagnetic layer, which is trimmed higher than the first nonmagnetic layer, facilitates the formation of the groove at step (d).

In addition, the etching rates of the second nonmagnetic layer and the main magnetic pole layer are preferably higher than that of the first nonmagnetic layer under the same etching conditions.

For example, the first nonmagnetic layer is composed of alumina ($Al_2O_3$), and the second nonmagnetic layer is composed of at least one material selected from the group consisting of Ti, W, Cr, Ta, Mo, Au, Pd, Pt, Ni—Cr, Ni—Cu, Al—Si—O, silicon oxides, titanium oxides, tungsten oxides, chromium oxides, and tantalum oxides.

Alternatively, for example, the first nonmagnetic layer is composed of $SiO_2$ and/or Al—Si—O, and the second nonmagnetic layer is composed of at least one material selected from the group consisting of W, $WO_3$, Cr, CrOX, and Mo.

In the manufacturing method according to the present invention, the main magnetic pole layer, which is composed of a magnetic material, and the first nonmagnetic layer, which is composed of an insulating material, have different etching rates; as a result, the main magnetic pole layer is trimmed by dry etching higher than the first nonmagnetic layer.

When, therefore, the top surfaces of the main magnetic pole layer and the first nonmagnetic layer are trimmed by dry etching, the groove can be defined by the inner side surfaces of the first nonmagnetic layer and the top surface of the main magnetic pole layer.

After the etching, the auxiliary magnetic pole layer is formed on the groove with the nonmagnetic material layer disposed therebetween. As a result, the projection can be readily formed in the recess. This projection is integrated with the auxiliary magnetic pole layer and extends toward the main magnetic pole layer.

In the perpendicular magnetic recording head manufactured by the method according to the present invention, the projection is positioned in the recess of the nonmagnetic material layer; therefore, a magnetic flux passing from the main magnetic pole layer to the auxiliary magnetic pole layer is generated in the magnetic head. Thus, this magnetic head can suitably adjust the strength of a magnetic field generated from the main magnetic pole layer more easily than a known perpendicular magnetic recording head that simply enhances the magnetic field.

The perpendicular magnetic recording head manufactured by the method according to the present invention can therefore generate and converge a magnetic field effectively and define the edges of recording tracks clearly on a recording medium to easily define a substantial recording track width within a predetermined range, thereby achieving narrower tracks for higher recording densities.

DESCRIPTION OF THE PREFERRED EMBODIMENTS

Figure 1:
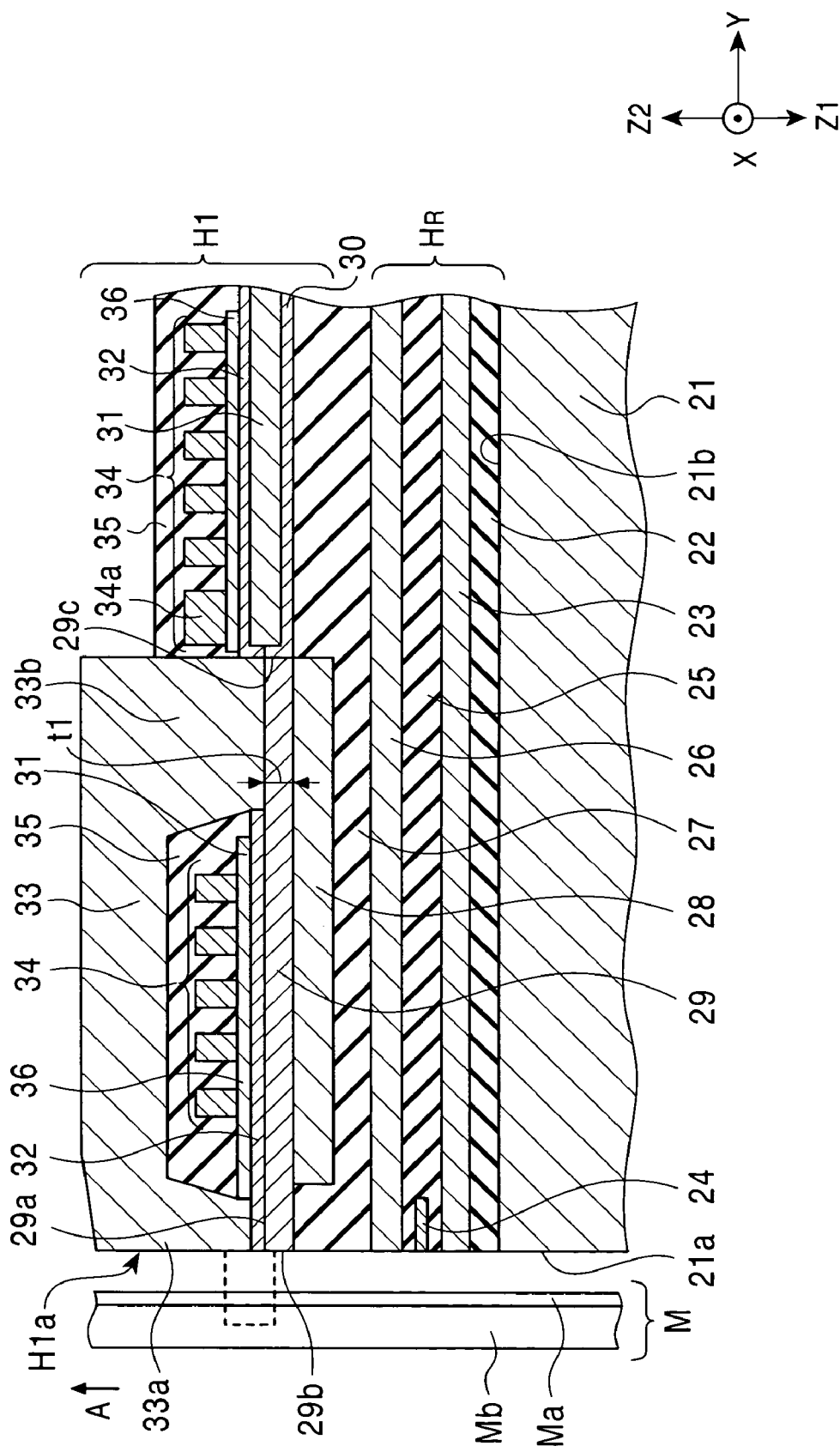
FIG. 1 is a sectional view of a perpendicular magnetic recording head that is manufactured by a method according to a first embodiment of the present invention and that faces a recording medium.

FIG. 1 is a longitudinal sectional view of a perpendicular magnetic recording head manufactured by a method according to a first embodiment of the present invention.

In FIG. 1, a perpendicular magnetic recording head H1 applies a perpendicular magnetic field onto a recording medium M to magnetize an outer hard film Ma of the recording medium M perpendicularly.

The recording medium M is, for example, a disc, and includes the hard film Ma, which has high residual magnetization, and an inner soft film Mb having high magnetic permeability. This recording medium M is rotated around its center.

A slider 21 is composed of a nonmagnetic material such as $Al_2O_3$—TiC. The front surface 21a of this slider 21 faces the recording medium M. When the recording medium M is rotated, the slider 21 floats over a surface of the recording medium M by surface airflow or slides over the surface of the recording medium M. In FIG. 1, the recording medium M moves in the A direction with respect to the slider 21.

A nonmagnetic insulating layer 22 composed of an inorganic material such as $Al_2O_3$ and $SiO_2$ is formed on a trailing side surface 21b of the slider 21. A read part HR is provided on this nonmagnetic insulating layer 22.

This read part HR includes a lower shield layer 23, an upper shield layer 26, an inorganic insulating layer (gap insulating layer) 25 separating the lower shield layer 23 and the upper shield layer 26, and a read element 24 disposed in the inorganic insulating layer 25. The read element 24 has a magnetoresistance effect such as anisotropic magnetoresistance (AMR) effect, giant magnetoresistance (GMR) effect, and tunneling magnetoresistance (TMR) effect.

A separating layer 27 composed of an inorganic material such as $Al_2O_3$ and $SiO_2$ is formed on the read part HR. The recording magnetic head H1 is provided on the separating layer 27. The front surface H1a of this recording magnetic head H1 facing the recording medium M is substantially flush with the front surface 21a of the slider 21.

Alternatively, without the read part $H_R$, the magnetic head H1 may be mounted on the trailing side surface 21b of the slider 21.

In the magnetic head H1, a yoke layer 28 is formed by plating with a ferromagnetic material such as permalloy (Ni—Fe). This yoke layer 28 is embedded in the separating layer 27 and is therefore not exposed at the front surface H1a of the magnetic head H1.

A seed layer (not shown in the drawings) composed of a conductive metal film such as Ni—Fe is deposited on the yoke layer 28 by sputtering.

According to this embodiment, in FIG. 1, a main magnetic pole layer 29 is formed on the seed layer by plating with a ferromagnetic material having a high saturation magnetic flux density. Examples of the ferromagnetic material used include Ni—Fe, Co—Fe, and Ni—Fe—Co. This main magnetic pole layer 29 is preferably composed of a magnetic material having a higher saturation magnetic flux density Bs than the material used for the yoke layer 28.

In this embodiment, the main magnetic pole layer 29 has a uniform thickness t1 from the front surface H1a to the rear of the magnetic head H1 in the height direction. The front end surface 29b of the main magnetic pole layer 29 is exposed at the front surface H1a of the magnetic head H1.

Figure 2:
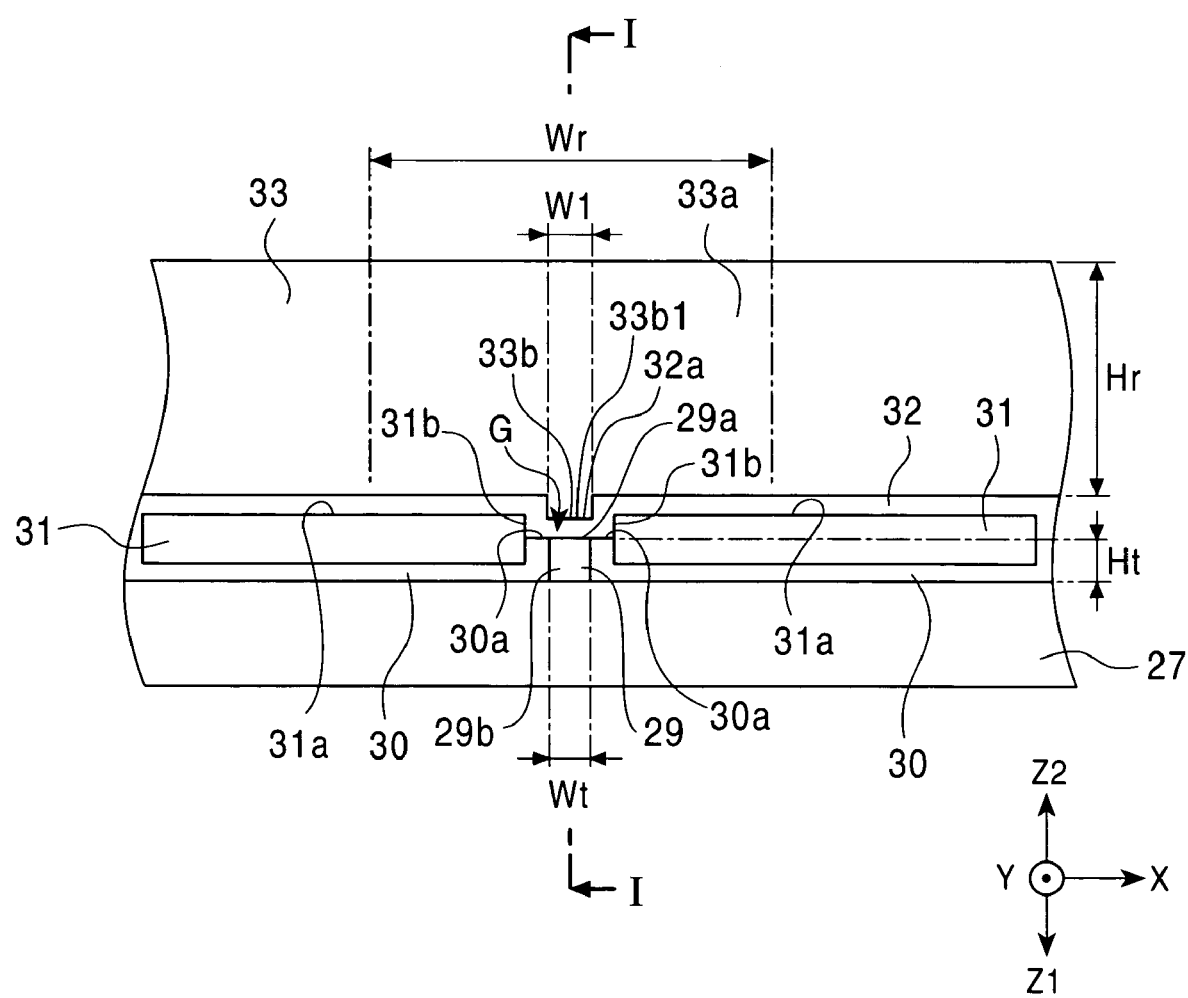
FIG. 2 is a front view of the magnetic head in FIG. 1 from the recording medium.

FIG. 2 is a front view of the magnetic head in FIG. 1. The sectional view of FIG. 1 is taken along dotted-chain line I-I in FIG. 2 in the direction of the arrows.

In FIG. 2, the main magnetic pole layer 29 has a width Wt in a track-width direction (the X direction in the drawing) at the front surface H1a of the magnetic head H1. The width of the yoke layer 28, which is not shown in FIG. 2, is larger than the width Wt of the main magnetic pole layer 29 in the track-width direction.

In FIG. 2, a first nonmagnetic layer 31 is formed on both sides of the main magnetic pole layer 29 with a second nonmagnetic layer 30 disposed therebetween. The top surfaces 30a of the second nonmagnetic layer 30 are positioned below the top surfaces 31a of the first nonmagnetic layer 31 (in the Z1 direction in the drawing).

A groove G is defined by the inner side surfaces 31b of the first nonmagnetic layer 31, the top surfaces 30a of the second nonmagnetic layer 30, and the top surface 29a of the main magnetic pole layer 29. A nonmagnetic material layer 32 composed of, for example, alumina or $SiO_2$ is provided on the first nonmagnetic layer 31 and the main magnetic pole layer 29. This nonmagnetic material layer 32 has a recess 32a on the groove G.

An auxiliary magnetic pole layer 33 composed of a ferromagnetic material such as permalloy is formed on the nonmagnetic material layer 32. The front end surface 33a of the auxiliary magnetic pole layer 33 is exposed at the front surface H1a of the magnetic head H1.

In FIG. 1, the auxiliary magnetic pole layer 33 is connected to the main magnetic pole layer 29 and the yoke layer 28 through a connection 33b in the rear of the magnetic head H1. This connection 33b provides a magnetic path from the auxiliary magnetic pole layer 33 to the main magnetic pole layer 29 and the yoke layer 28.

The connection 33b is surrounded by the nonmagnetic material layer 32. A coil layer 34 composed of a conductive material such as Cu is formed on the nonmagnetic material layer 32 with a coil-insulating base layer 36 disposed therebetween by, for example, frame plating. This coil layer 34 has a spiral pattern with a predetermined number of turns around the connection 33b. Alternatively, the coil layer 34 may have a spiral pattern around the main magnetic pole layer 29. A coil-insulating layer 35 is formed over the coil layer 34. The auxiliary magnetic pole layer 33 extends from above the coil-insulating layer 35 to the connection 33b.

A connection end 34a in the center of the coil layer 34 is connected to a lead layer (not shown in the drawings) for supplying a recording current to the coil layer 34.

The auxiliary magnetic pole layer 33 and the lead layer are covered with a protective layer (not shown in the drawings) composed of, for example, an inorganic nonmagnetic insulating material.

In the magnetic head H1 in FIGS. 1 and 2, a recording current supplied to the coil layer 34 through the lead layer induces a recording magnetic field in the auxiliary magnetic pole layer 33 and the yoke layer 28. At the front surface H1a of the magnetic head H1, as shown in FIG. 1, the recording magnetic field leaks from the front end surface 29a of the main magnetic pole layer 29 and the front end surface 33a of the auxiliary magnetic pole layer 33, penetrates the hard film Ma of the recording medium M, and passes through the soft film Mb.

As shown in FIG. 2, the thickness Ht of the front end surface 29b of the main magnetic pole layer 29 is smaller than the thickness Hr of the front end surface 33a of the auxiliary magnetic pole layer 33. On the other hand, the width Wt of the front end surface 29b of the main magnetic pole layer 29 in the track-width direction (the X direction in the drawing) is sufficiently smaller than the width Wr of the front end surface 33b of the auxiliary magnetic pole layer 33 in the same direction. At the front surface H1a of the magnetic head H1, therefore, the area of the front end surface 29b of the main magnetic pole layer 29 is sufficiently smaller than that of the front end surface 33a of the auxiliary magnetic pole layer 33.

Thus, the magnetic flux C of the leakage recording magnetic field is concentrated at the front end surface 29b of the main magnetic pole layer 29 to magnetize the hard film Ma perpendicularly, thereby recording magnetic data on the recording medium M.

Features of this embodiment will now be described.

In FIG. 2, the nonmagnetic material layer 32 has the recess 32a on the groove G. A projection 33b integrated with the auxiliary magnetic pole layer 33 in the front of the magnetic head H1 extends toward the main magnetic pole layer 29 and is positioned in the recess 32a.

In the magnetic head H1, the projection 33b, extending from the auxiliary magnetic pole layer 33 toward the main magnetic pole layer 29, can suppress the divergence of the magnetic flux C, which passes from the main magnetic pole layer 29 to the auxiliary magnetic pole layer 33.

This magnetic head H1 can therefore generate and converge a magnetic field effectively and define the edges of recording tracks clearly on a recording medium to easily define a substantial recording track width within a predetermined range, thereby achieving narrower tracks for higher recording densities.

In this embodiment, the second nonmagnetic layer 30 separates the first nonmagnetic layer 31 and the main magnetic pole layer 29. The top surfaces 30a of the second nonmagnetic layer 30 are positioned below the top surfaces 31a of the first nonmagnetic layer 31 (in the Z1 direction in the drawings).

For example, the first nonmagnetic layer 31 is composed of alumina ($Al_2O_3$) while the second nonmagnetic layer 30 is composed of at least one material selected from the group consisting of Ti, W, Cr, Ta, Mo, Au, Pd, Pt, Ni—Cr, Ni—Cu, Al—Si—O, silicon oxides such as $SiO_2$, titanium oxides, tungsten oxides, chromium oxides, and tantalum oxides.

Alternatively, for example, the first nonmagnetic layer 31 is composed of $SiO_2$ and/or Al—Si—O while the second nonmagnetic layer 30 is composed of at least one material selected from the group consisting of Ti, Cr, Ta, W, $WO_3$, Mo, Au, Pd, Pt, Ni—Cr, Ni—Cu, and CrOX.

If the materials for the first nonmagnetic layer 31 and the second nonmagnetic layer 30 are selected as described above, the etching rate of the second nonmagnetic layer 30 is higher than that of the first nonmagnetic layer 31 under the same etching conditions. The top surface 29a of the main magnetic pole layer 29 can therefore be planarized more suitably in the magnetic head H1 than in a magnetic head including no second nonmagnetic layer 30, as will be described later.

The width W1 of the bottom surface 33b1 of the projection 33b in the track-width direction is preferably smaller than the width Wt of the front end surface 29b of the main magnetic pole layer 29 in order to converge the magnetic field C. In the present invention, however, the width W1 of the bottom surface 33b1 of the projection 33b in the track-width direction may be larger than or equal to the width Wt of the front end surface 29b of the main magnetic pole layer 29.

As the first embodiment of the present invention, a method for manufacturing the perpendicular magnetic recording head in FIGS. 1 and 2 will now be described.

FIGS. 3A, 3B, 4A, 4B, 5A, 5B, 5C, 5D, 6A, and 6B illustrate the individual steps of the manufacturing method. FIGS. 3A, 4A, 5A, 5C, and 6A are partial front views showing the front surface H1a, while FIGS. 3B, 4B, 5B, 5D, and 6B are longitudinal sectional views.

Figure 3A:
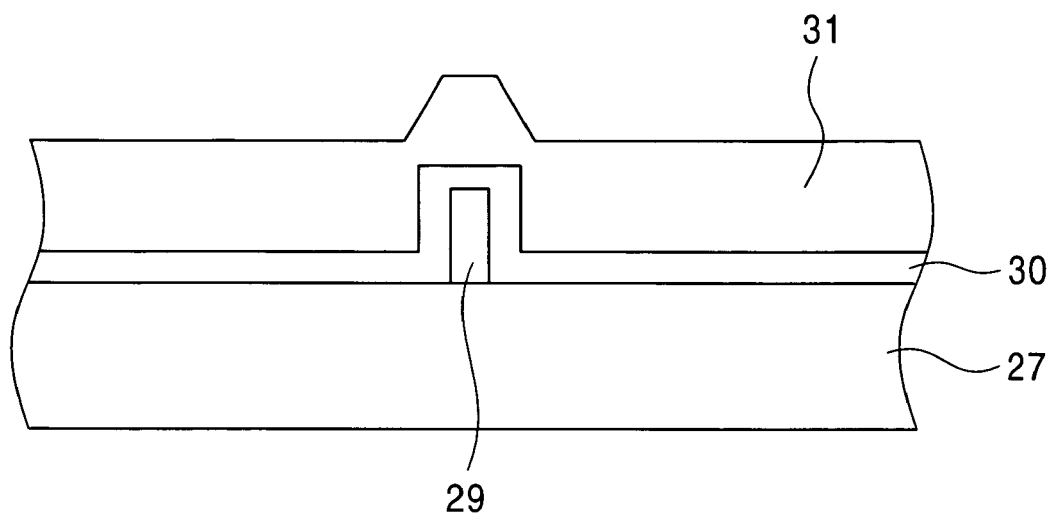
FIG. 3A is a front view illustrating a step of the method for manufacturing the magnetic head according to the first embodiment of the present invention.
Figure 3B:
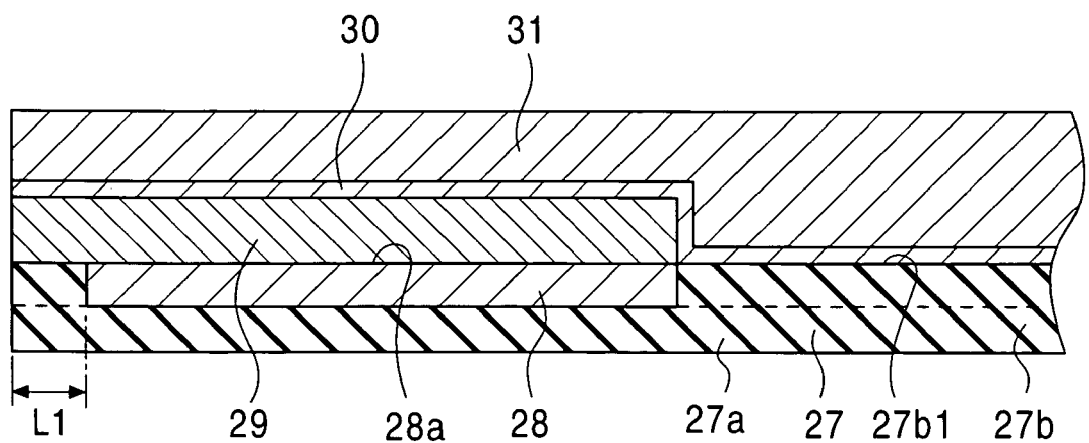
FIG. 3B is a sectional view illustrating the step of the method for manufacturing the magnetic head according to the first embodiment of the present invention.

In a step in FIGS. 3A and 3B, the separating layer 27, which is composed of an insulating material such as alumina and $SiO_2$' is formed on the read part HR. The yoke layer 28, which is composed of a ferromagnetic material, is embedded in the separating layer 27.

First, a first separating layer 27a composed of alumina or $SiO_2$ is deposited by sputtering or evaporation, and the top surface of the first separating layer 27a is planarized by, for example, chemical mechanical polishing (CMP). The yoke layer 28 is formed on the first separating layer 27a by frame plating with a ferromagnetic material such as Ni—Fe at a predetermined distance L1 from the front surface H1a of the magnetic head H1. Subsequently, a second separating layer 27b composed of alumina or $SiO_2$ is deposited by sputtering or evaporation so as to cover the first separating layer 27a and the yoke layer 28. The top surface of the second separating layer 27b is trimmed by, for example, CMP to expose the top surface 28a of the yoke layer 28. The top surface 28a of the yoke layer 28 and the top surface 27b1 of the second separating layer 27b are planarized so as to be flush.

The seed layer (not shown in the drawings) is deposited by sputtering on the top surface 28a of the yoke layer 28 and the top surface 27b1 of the second separating layer 27b. This seed layer is composed of a magnetic material such as Ni—Fe.

Using the seed layer as an electrode, the main magnetic pole layer 29 is formed by frame plating with a frame composed of a resist layer. The main magnetic pole layer 29 is composed of a ferromagnetic material having a higher saturation magnetic flux density than the material used for the yoke layer 28. Examples of the material for the main magnetic pole layer 29 include Ni—Fe, Fe—Co—Rh, Fe—Co, and Fe—Co—Ni. The resist layer is removed after the formation of the main magnetic pole layer 29. In the step of forming the main magnetic pole layer 29, as shown in FIGS. 3A and 3B, the thickness of the main magnetic pole layer 29 must be larger than the final thickness. After the removal of the resist layer, the residual seed layer exposed around the main magnetic pole layer 29 is removed by, for example, ion milling. The main magnetic pole layer 29 may be trimmed in the track-width direction by ion milling to reduce the width of the main magnetic pole layer 29 in the track-width direction.

The second nonmagnetic layer 30 is provided on the sides, rear, and top of the main magnetic pole layer 29, and the first nonmagnetic layer 31 is deposited on the second nonmagnetic layer 30.

For example, the first nonmagnetic layer 31 is composed of alumina ($Al_2O_3$) while the second nonmagnetic layer 30 is composed of at least one material selected from the group consisting of Ti, W, Cr, Ta, Mo, Au, Pd, Pt, Ni—Cr, Ni—Cu, Al—Si—O, silicon oxides such as $SiO_2$, titanium oxides, tungsten oxides, chromium oxides, and tantalum oxides.

Alternatively, for example, the first nonmagnetic layer 31 is composed of $SiO_2$ and/or Al—Si—O while the second nonmagnetic layer 30 is composed of at least one material selected from the group consisting of Ti, Cr, Ta, W, $WO_3$, Mo, Au, Pd, Pt, Ni—Cr, Ni—Cu, and CrOX.

If the materials for the first nonmagnetic layer 31 and the second nonmagnetic layer 30 are selected as described above, the etching rate of the second nonmagnetic layer 30 is higher than that of the first nonmagnetic layer 31 under the same etching conditions.

In addition, the etching rates of the second nonmagnetic layer 30 and the main magnetic pole layer 29 are higher than that of the first nonmagnetic layer 31 under the same etching conditions.

Figure 4A:
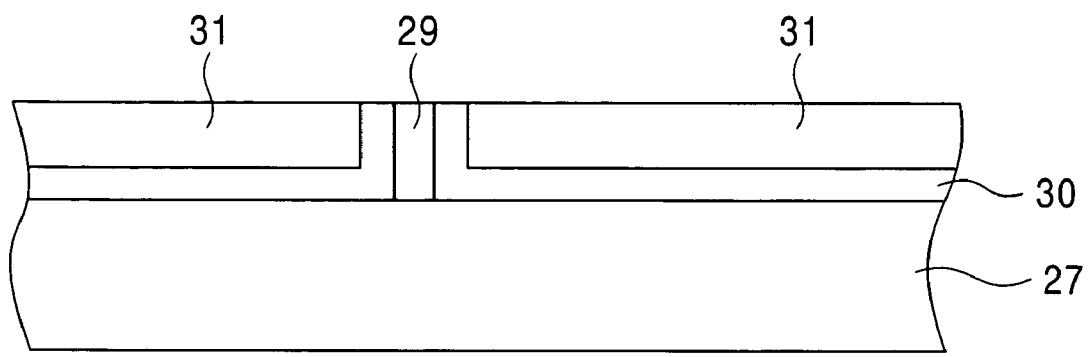
FIG. 4A is a front view illustrating a step of the method for manufacturing the magnetic head according to the first embodiment of the present invention.
Figure 4B:
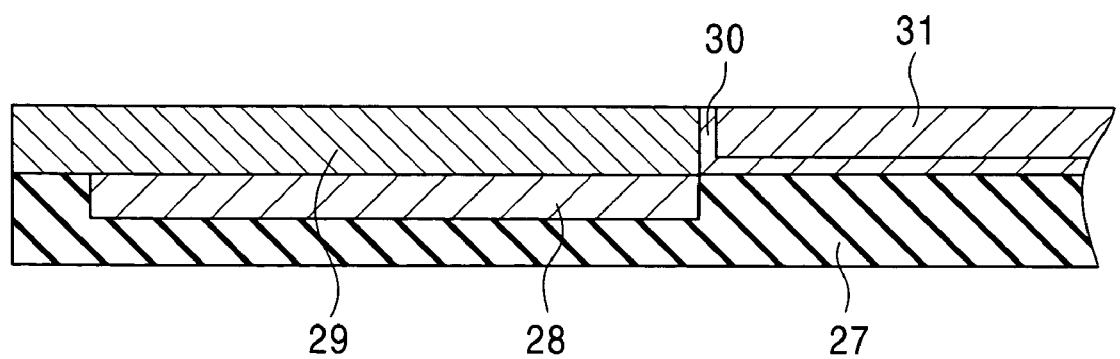
FIG. 4B is a sectional view illustrating the step of the method for manufacturing the magnetic head according to the first embodiment of the present invention.

For example, the etching rates of the first nonmagnetic layer 31, the second nonmagnetic layer 30, and the main magnetic pole layer 29 are compared under the following etching conditions:

Etching gas: neutral argon (Ar)
Beam voltage for ion milling: 400 V
Beam current for ion milling: 300 mA
Beam angle θ for ion milling: 45° with respect to the normal direction of a surface of a substrate In a step in FIGS. 4A and 4B, the top surface of the first nonmagnetic layer 31 is trimmed by CMP so that the top surfaces of the main magnetic pole layer 29 and the second nonmagnetic layer 30 are exposed and are flush with the top surface of the first nonmagnetic layer 31.

Figure 5A:
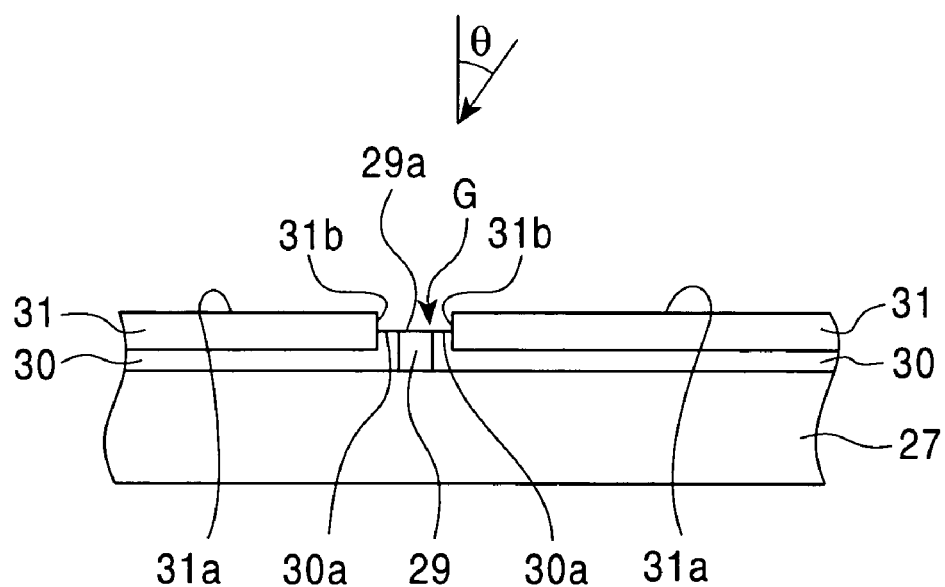
FIG. 5A is a front view illustrating a step of the method for manufacturing the magnetic head according to the first embodiment of the present invention.
Figure 5B:
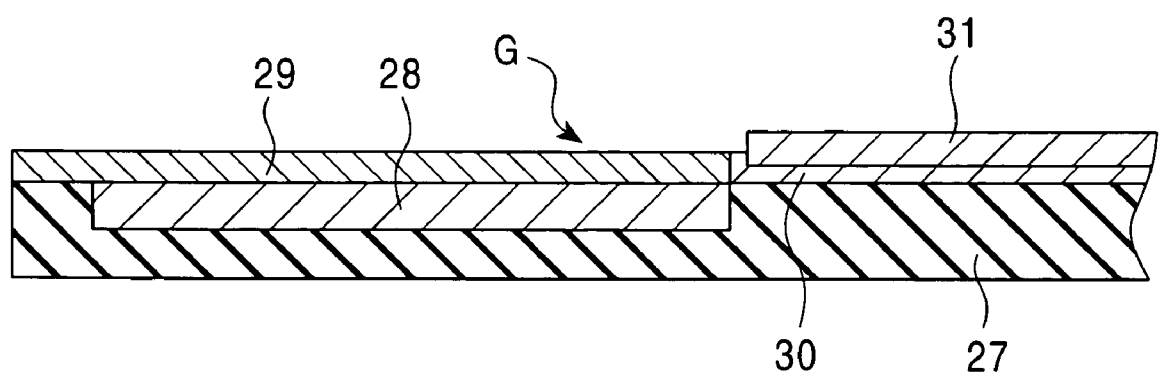
FIG. 5B is a sectional view illustrating the step of the method for manufacturing the magnetic head according to the first embodiment of the present invention.

In a step in FIGS. 5A and 5B, the top surfaces of the first nonmagnetic layer 31, the second nonmagnetic layer 30, and the main magnetic pole layer 29 are trimmed by dry etching (ion milling).

Then, the groove G can be defined by the inner side surfaces 31b of the first nonmagnetic layer 31 and the top surface 29a of the main magnetic pole layer 29.

The main magnetic pole layer 29, which is composed of a magnetic material, and the first nonmagnetic layer 31, which is composed of an insulating material, have different etching rates; as a result, the main magnetic pole layer 29 is trimmed by dry etching higher than the first nonmagnetic layer 31.

When, therefore, the top surfaces of the main magnetic pole layer 29 and the first nonmagnetic layer 31 are trimmed by dry etching, the groove G can be defined by the inner side surfaces 31b of the first nonmagnetic layer 31 and the top surface 29a of the main magnetic pole layer 29.

Figure 6A:
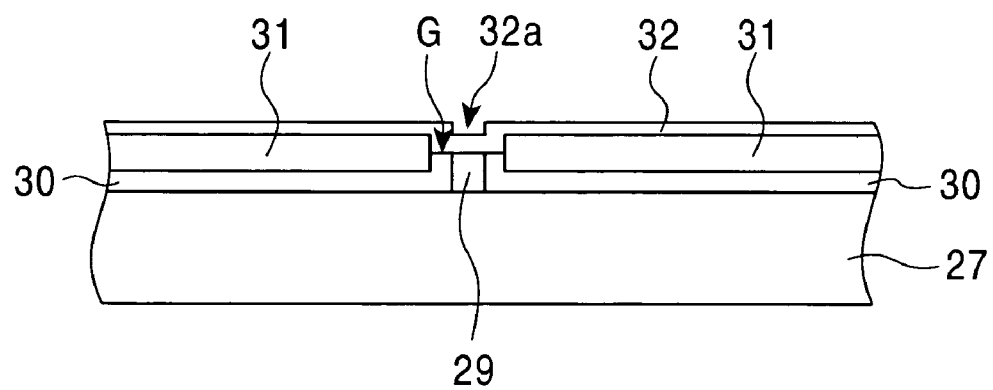
FIG. 6A is a front view illustrating a step of the method for manufacturing the magnetic head according to the first embodiment of the present invention.
Figure 6B:
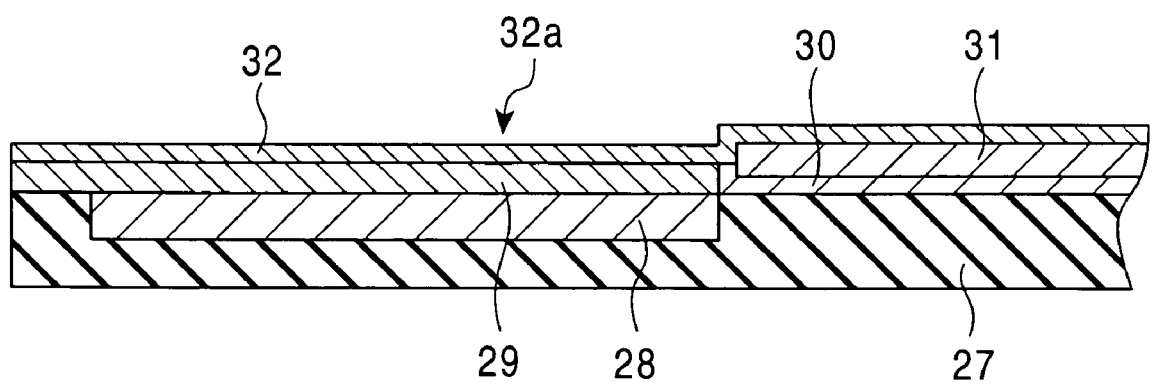
FIG. 6B is a sectional view illustrating the step of the method for manufacturing the magnetic head according to the first embodiment of the present invention.

In a step in FIGS. 6A and 6B, the nonmagnetic material layer 32 is deposited on the first nonmagnetic layer 31 and the main magnetic pole layer 29 to form the recess 32a of the nonmagnetic material layer 32 on the groove G.

After the step in FIGS. 6A and 6B, the coil-insulating base layer 36, the coil layer 34, the coil-insulating layer 35, and the auxiliary magnetic pole layer 33 are formed. For forming the connection 33b, before the formation of the auxiliary magnetic pole layer 33, a through hole is provided in the coil-insulating layer 35 and the nonmagnetic material layer 32 to expose the rear top surface of the main magnetic pole layer 29.

In the front of the magnetic head H1, the auxiliary magnetic pole layer 33 is formed on the nonmagnetic material layer 32, and the projection 33b of the auxiliary magnetic pole layer 33 is formed in the recess 32a of the nonmagnetic material layer 32. The projection 33b is formed together with the auxiliary magnetic pole layer 33 by plating and extends toward the main magnetic pole layer 29 (in the Z1 direction in the drawings).

In this embodiment, the groove G is formed using the difference in etching rates for dry etching between the main magnetic pole layer 29 and the first nonmagnetic layer 31. The auxiliary magnetic pole layer 33 is formed on the groove G with the nonmagnetic material layer 32 disposed therebetween. Thus, the projection 33b, which is integrated with the auxiliary magnetic pole layer 33 and extends toward the main magnetic pole layer 29, can readily be formed in the recess 32a of the nonmagnetic material layer 32.

In this embodiment, additionally, the second nonmagnetic layer 30 is formed on the top and sides of the main magnetic pole layer 29, and the first nonmagnetic layer 31 is formed on the top and sides of the second nonmagnetic layer 30. In the dry etching step in FIGS. 5A and 5B, the top surfaces of the main magnetic pole layer 29, the second nonmagnetic layer 30, and the first nonmagnetic layer 31 are trimmed by dry etching so that the top surfaces 30a of the second nonmagnetic layer 30 are positioned below the top surfaces 31a of the first nonmagnetic layer 31 (in the Z1 direction in the drawings).

In this embodiment, the materials for the first nonmagnetic layer 31 and the second nonmagnetic layer 30 are selected as described above; hence, the etching rate of the second nonmagnetic layer 30 is higher than that of the first nonmagnetic layer 31 under the same etching conditions.

In the dry etching, therefore, the second nonmagnetic layer 30 is trimmed higher than the first nonmagnetic layer 31 to facilitate the formation of the groove G. As a result, the top surface 29a of the main magnetic pole layer 29 can easily be trimmed deeply and planarized to ensure the formation of the groove G by the inner side surfaces 31b of the first nonmagnetic layer 31 and the top surface 29a of the main magnetic pole layer 29. In the method of this embodiment, the groove G and the recess 32a of the nonmagnetic material layer 32 can be formed more reliably using the second nonmagnetic layer 30 than without the second nonmagnetic layer 30 in a manufacturing method described later, even if the width of the main magnetic pole layer 29 in the track-width direction (in the X direction in the drawings) is decreased.

In the step in FIGS. 5A and 5B, the top surface 29a of the front of the main magnetic pole layer 29, the top surfaces 30a of the front of the second nonmagnetic layer 30, and the top surfaces 31a of the front of the first nonmagnetic layer 31 are trimmed by ion milling.

If, for example, the first nonmagnetic layer 31 is composed of alumina ($Al_2O_3$) and the second nonmagnetic layer 30 is composed of at least one material selected from the group consisting of Ti, W, Cr, Ta, Mo, Au, silicon oxides such as $SiO_2$, titanium oxides, tungsten oxides such as $WO_3$, chromium oxides such as CrOX, and tantalum oxides, the second nonmagnetic layer 30 can be selectively trimmed by reactive ion etching.

Alternatively, if, for example, the first nonmagnetic layer 31 is composed of $SiO_2$ and the second nonmagnetic layer 30 is composed of at least one material selected from the group consisting of W, $WO_3$, Cr, CrOX, and Mo, the second nonmagnetic layer 30 can be selectively trimmed by reactive ion etching as well.

Figure 5C:
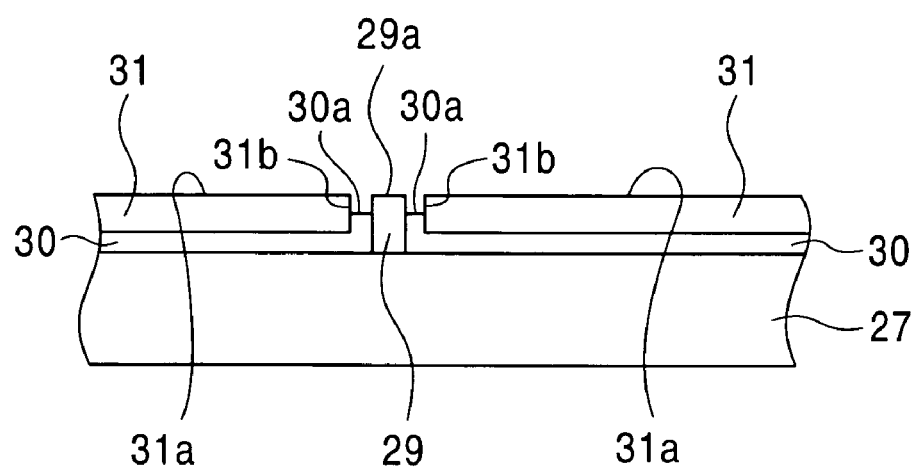
FIG. 5C is a front view illustrating a step of the method for manufacturing the magnetic head according to the first embodiment of the present invention.
Figure 5D:
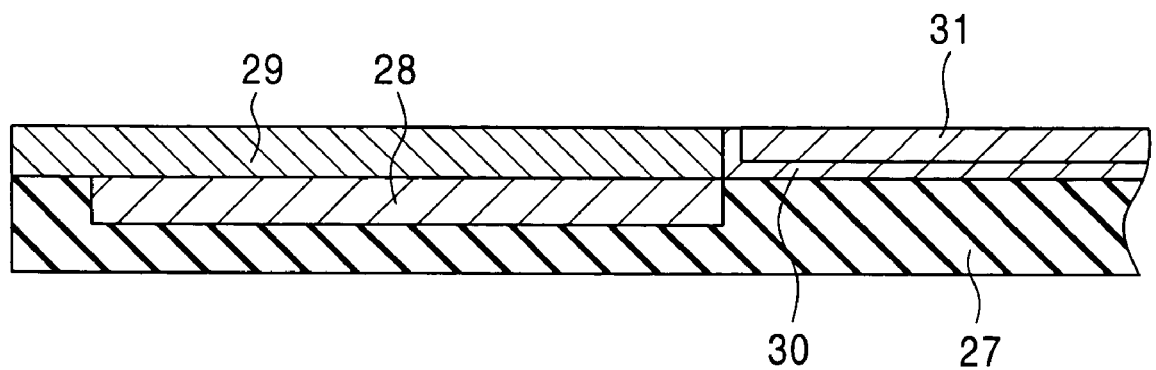
FIG. 5D is a sectional view illustrating the step of the method for manufacturing the magnetic head according to the first embodiment of the present invention.

When the second nonmagnetic layer 30 is selectively trimmed by reactive ion etching, only the top surfaces 30a of the front of the second nonmagnetic layer 30 are trimmed as shown in FIGS. 5C and 5D. After the reactive ion etching, the top surface 29a of the front of the main magnetic pole layer 29 may be trimmed by ion milling as shown in FIGS. 5A and 5B.

FIGS. 7A, 7B, 8A, 8B, 9A, 9B, 10A, 10B, 11A, and 11B illustrate the individual steps of a method for manufacturing a perpendicular magnetic recording head according to a second embodiment of the present invention. FIGS. 7A, 8A, 9A, 10A, and 11A are partial front views showing the front surface H1a. FIGS. 7B, 8B, 9B, 10B, and 11B are longitudinal sectional views. The method of the second embodiment is different from that of the first embodiment in that the second nonmagnetic layer 30 is not formed. In FIGS. 7A, 7B, 8A, 8B, 9A, 9B, 10A, 10B, 11A, and 11B, the structures and materials of members having the same reference numerals as in FIGS. 3A, 3B, 4A, 4B, 5A, 5B, 5C, 5D, 6A, and 6B are the same unless otherwise described.

Figure 7A:
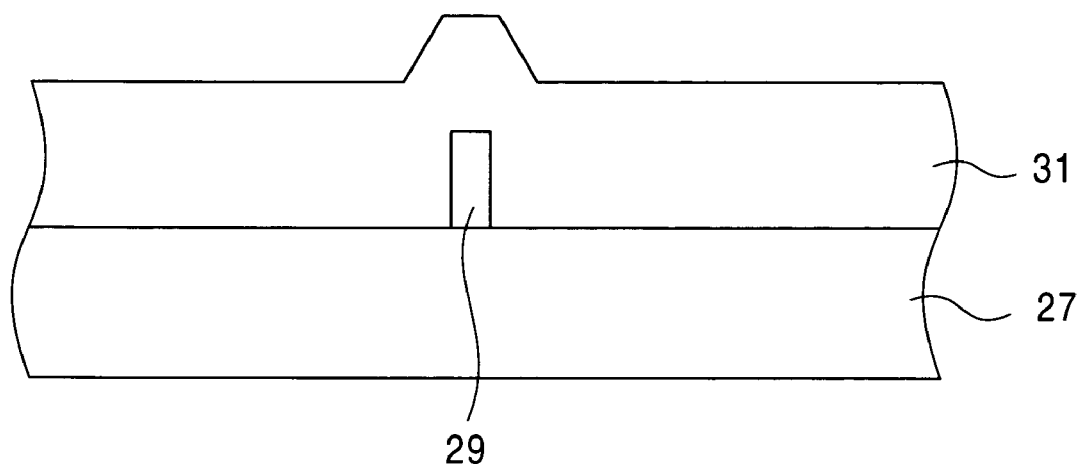
FIG. 7A is a front view illustrating a step of a method for manufacturing a perpendicular magnetic recording head according to a second embodiment of the present invention.
Figure 7B:
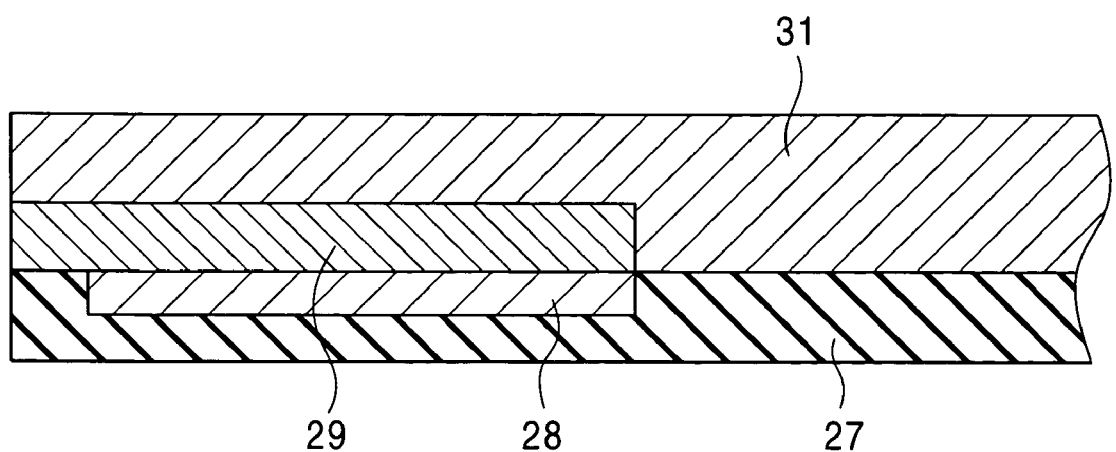
FIG. 7B is a sectional view illustrating the step of the method for manufacturing the magnetic head according to the second embodiment of the present invention.

In a step in FIGS. 7A and 7B, the separating layer 27, which is composed of an insulating material such as alumina and $SiO_2$, is formed on the read part HR. The yoke layer 28, which is composed of a ferromagnetic material, is embedded in the separating layer 27.

The main magnetic pole layer 29 is formed by frame plating with a frame composed of a resist layer.

The first nonmagnetic layer 31 is provided on the sides, rear, and top of the main magnetic pole layer 29.

In this embodiment, the first nonmagnetic layer 31 is composed of, for example, at least one of alumina ($Al_2O_3$), $SiO_2$, and Al—Si—O.

Figure 8A:
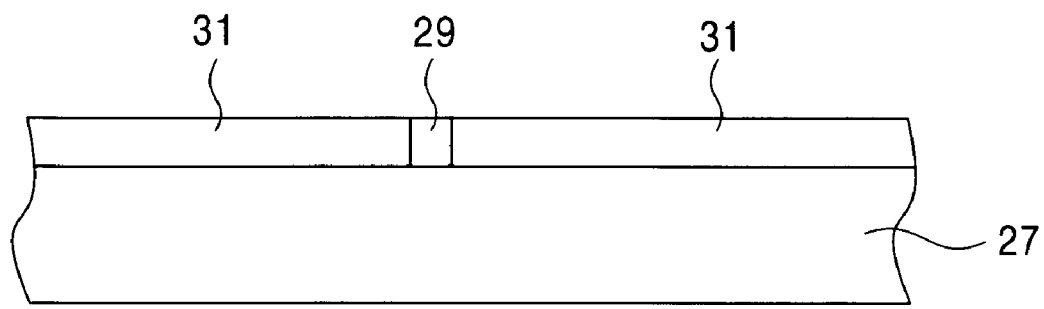
FIG. 8A is a front view illustrating a step of the method for manufacturing the magnetic head according to the second embodiment of the present invention.
Figure 8B:
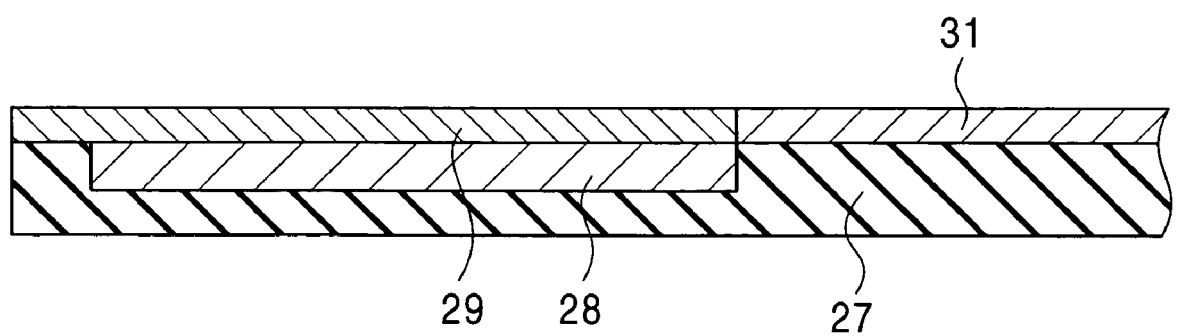
FIG. 8B is a sectional view illustrating the step of the method for manufacturing the magnetic head according to the second embodiment of the present invention.

In a step in FIGS. 8A and 8B, the top surface of the first nonmagnetic layer 31 is trimmed by CMP so that the top surface of the main magnetic pole layer 29 is exposed and is flush with the top surface of the first nonmagnetic layer 31.

Figure 9A:
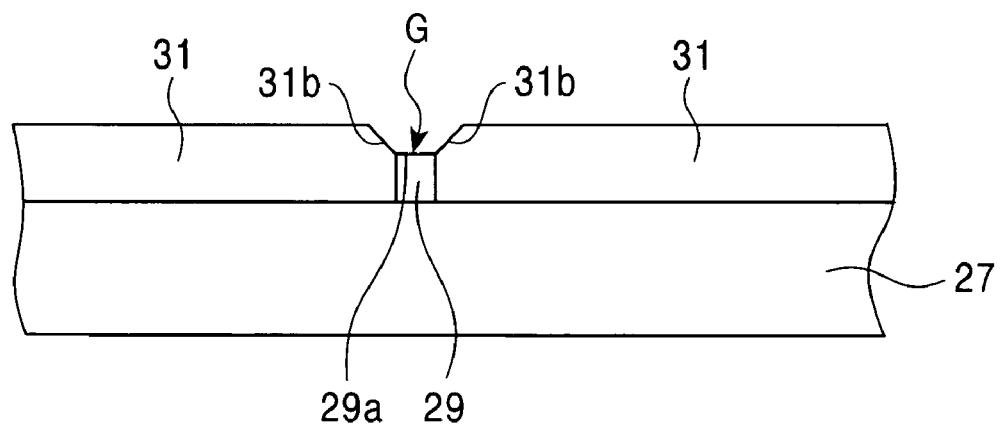
FIG. 9A is a front view illustrating a step of the method for manufacturing the magnetic head according to the second embodiment of the present invention.
Figure 9B:
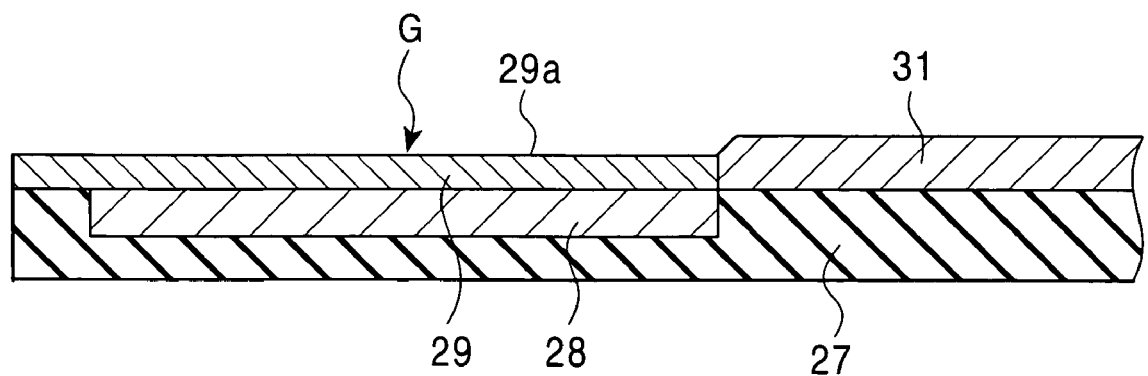
FIG. 9B is a sectional view illustrating the step of the method for manufacturing the magnetic head according to the second embodiment of the present invention.

In a step in FIGS. 9A and 9B, the top surfaces of the first nonmagnetic layer 31 and the main magnetic pole layer 29 are trimmed by dry etching (ion milling).

Then, the groove G can be defined by the inner side surfaces 31b of the first nonmagnetic layer 31 and the top surface 29a of the main magnetic pole layer 29.

The main magnetic pole layer 29, which is composed of a magnetic material, and the first nonmagnetic layer 31, which is composed of an insulating material, have different etching rates; as a result, the main magnetic pole layer 29 is trimmed by dry etching higher than the first nonmagnetic layer 31.

When, therefore, the top surfaces of the main magnetic pole layer 29 and the first nonmagnetic layer 31 are trimmed by dry etching, the groove G can be defined by the inner side surfaces 31b of the first nonmagnetic layer 31 and the top surface 29a of the main magnetic pole layer 29.

Figure 10A:
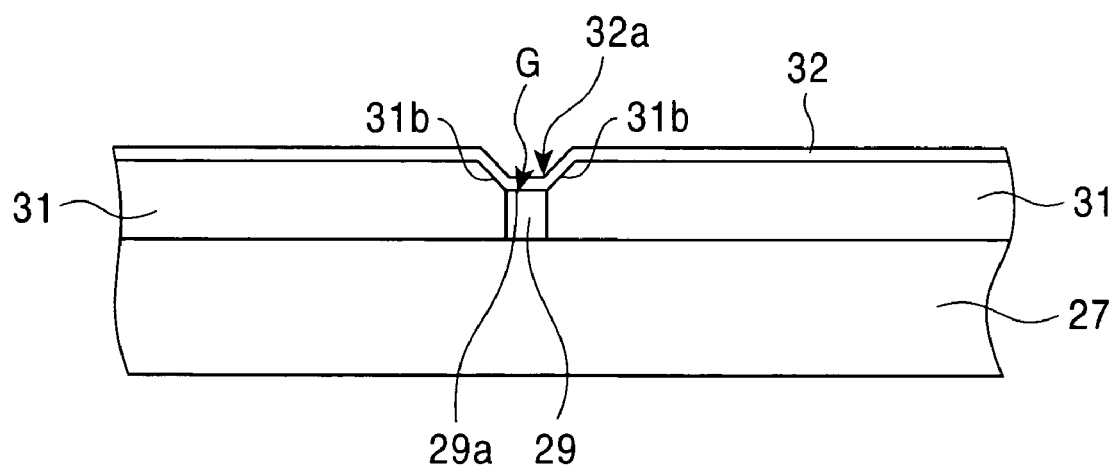
FIG. 10A is a front view illustrating a step of the method for manufacturing the magnetic head according to the second embodiment of the present invention.
Figure 10B:
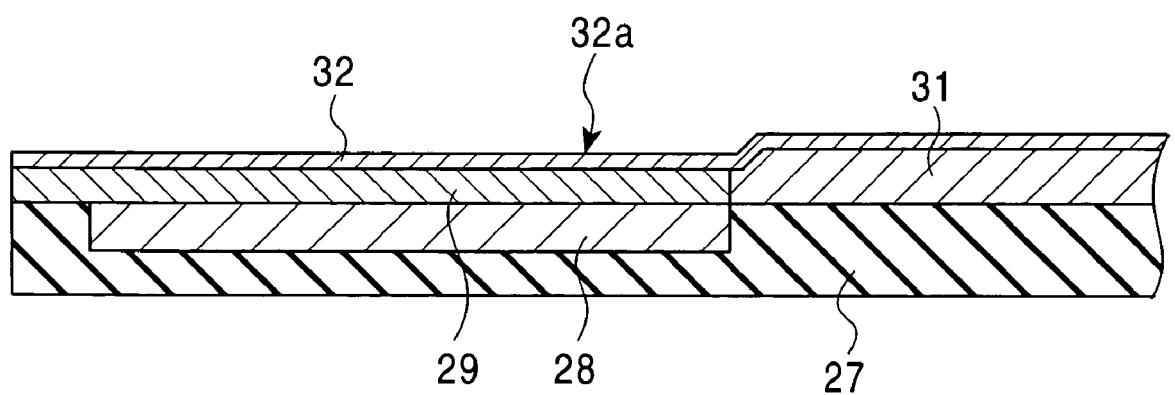
FIG. 10B is a sectional view illustrating the step of the method for manufacturing the magnetic head according to the second embodiment of the present invention.

In a step in FIGS. 10A and 10B, the nonmagnetic material layer 32 is deposited on the first nonmagnetic layer 31 and the main magnetic pole layer 29 to form the recess 32a of the nonmagnetic material layer 32 on the groove G.

Figure 11A:
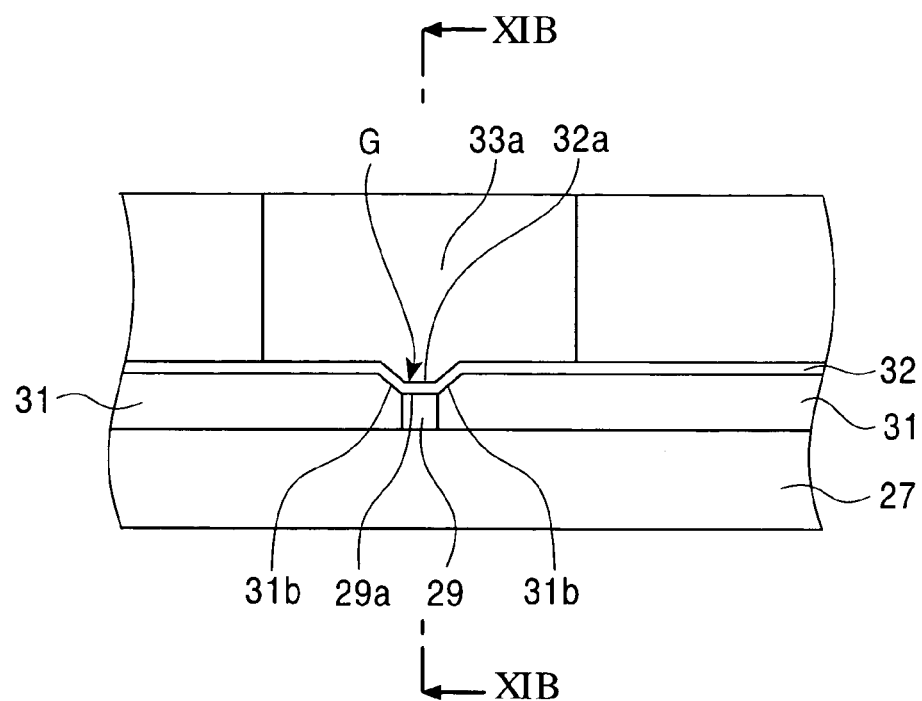
FIG. 11A is a front view of the magnetic head manufactured by the method according to the second embodiment of the present invention.
Figure 11B:
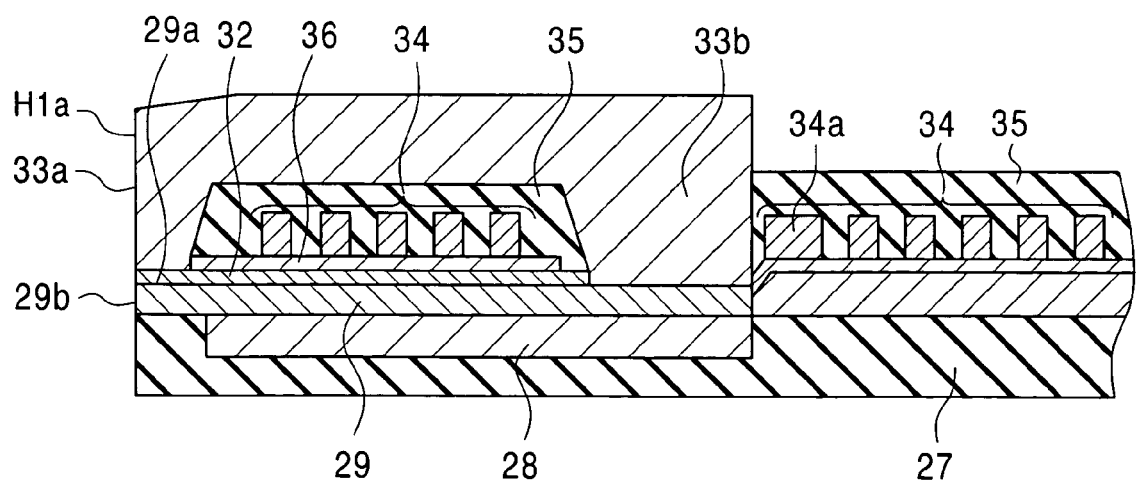
FIG. 11B is a sectional view of the magnetic head in FIG. 11A.
Figure 12:
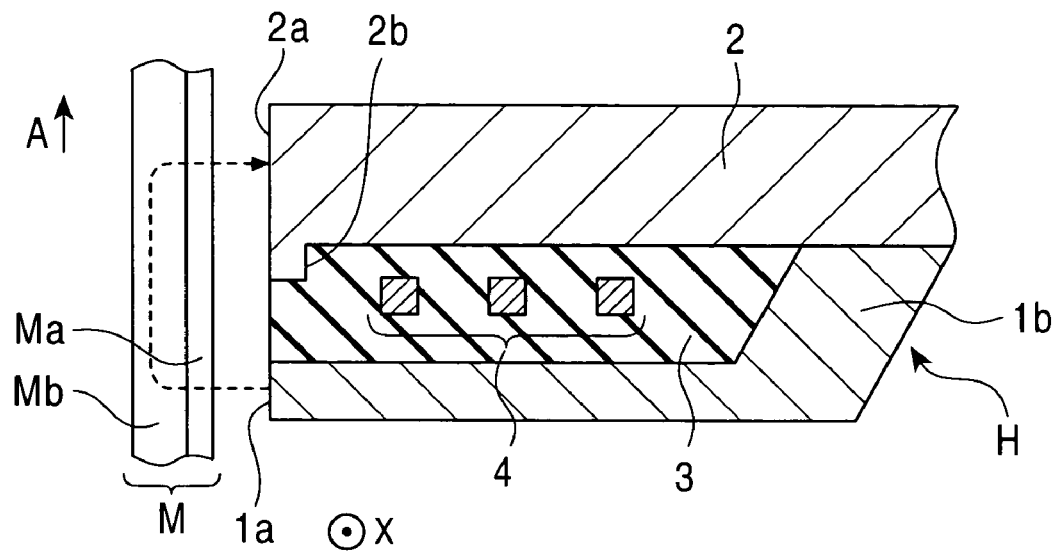
FIG. 12 is a sectional view of a known perpendicular magnetic recording head facing a recording medium.
Figure 13:
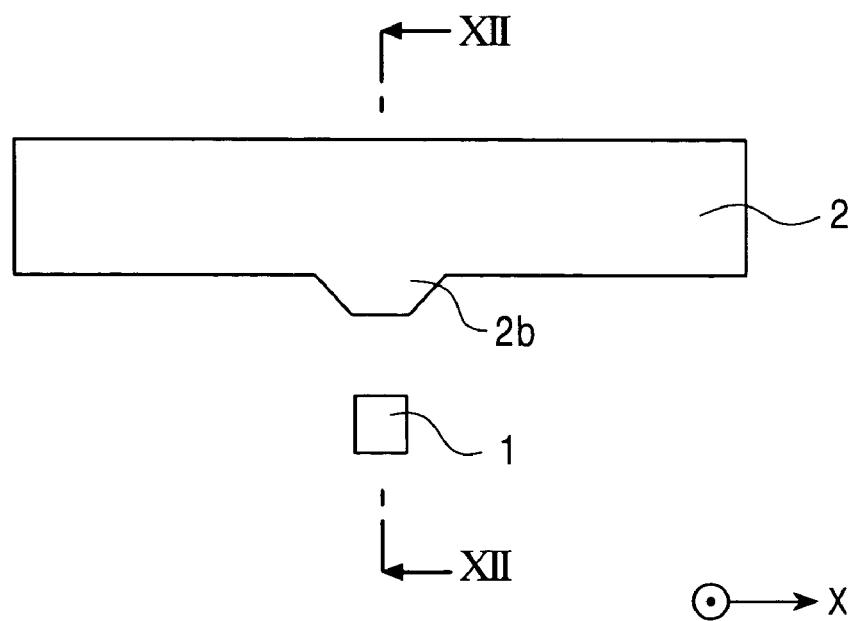
FIG. 13 is a front view of the magnetic head in FIG. 12 from the recording medium.

After the step in FIGS. 10A and 10B, the coil-insulating base layer 36, the coil layer 34, the coil-insulating layer 35, and the auxiliary magnetic pole layer 33 are formed, thus providing a perpendicular magnetic recording head in FIGS. 11A and 11B.

For forming the connection 33b, before the formation of the auxiliary magnetic pole layer 33, a through hole is provided in the coil-insulating layer 35 and the nonmagnetic material layer 32 to expose the rear top surface of the main magnetic pole layer 29.

In the front of the magnetic head, the auxiliary magnetic pole layer 33 is formed on the nonmagnetic material layer 32, and the projection 33b of the auxiliary magnetic pole layer 33 is formed in the recess 32a of the nonmagnetic material layer 32. The projection 33b is formed together with the auxiliary magnetic pole layer 33 by plating and extends toward the main magnetic pole layer 29 (in the Z1 direction in the drawings).

In this embodiment, the groove G is formed using the difference in etching rates for dry etching between the main magnetic pole layer 29 and the first nonmagnetic layer 31. The auxiliary magnetic pole layer 33 is formed on the groove G with the nonmagnetic material layer 32 disposed therebetween. Thus, the projection 33b, which is integrated with the auxiliary magnetic pole layer 33 and extends toward the main magnetic pole layer 29, can readily be formed in the recess 32a of the nonmagnetic material layer 32.

The magnetic head in FIGS. 11A and 11B is different from the magnetic head H1 in FIG. 1 in that the second nonmagnetic layer 30 is not formed. In FIGS. 11A and 11B, the structures and materials of members having the same reference numerals as in FIGS. 1 and 2 are the same unless otherwise described.

Referring to FIG. 11A, the first nonmagnetic layer 31 is formed on the sides of the main magnetic pole layer 29. The first nonmagnetic layer 31 is composed of, for example, at least one of alumina ($Al_2O_3$), $SiO_2$, and Al—Si—O.

The groove G is defined by the top surface 29a of the main magnetic pole layer 29 and the inner side surfaces 31b of the first nonmagnetic layer 31 provided on the sides of the main magnetic pole layer 29. In this embodiment, in which the second nonmagnetic layer 30 is not formed, the inner side surfaces 31b of the first nonmagnetic layer 31 tend to be inclined with respect to the plane direction, though they may be perpendicular to the plane direction.

In the magnetic head in FIGS. 11A and 11B, a recording current supplied to the coil layer 34 induces a recording magnetic field in the auxiliary magnetic pole layer 33 and the yoke layer 28. The area of the front end surface 29b of the main magnetic pole layer 29 is sufficiently smaller than that of the front end surface 33a of the auxiliary magnetic pole layer 33. Thus, the magnetic flux C of a leakage recording magnetic field is concentrated at the front end surface 29b of the main magnetic pole layer 29 to magnetize the hard film Ma of the recording medium M perpendicularly.

In FIG. 11A, the nonmagnetic material layer 32 has the recess 32a on the groove G. The projection 33b, which is integrated with the auxiliary magnetic pole layer 33, extends toward the main magnetic pole layer 29 and is positioned in the recess 32a.

This projection 33b can suppress the divergence of the magnetic flux C, which passes from the main magnetic pole layer 29 to the auxiliary magnetic pole layer 33.

This magnetic head can therefore generate and converge a magnetic field effectively and define the edges of recording tracks clearly on a recording medium to easily define a substantial recording track width within a predetermined range, thereby achieving narrower tracks for higher recording densities.

The width W1 of the bottom surface 33b1 of the projection 33b in the track-width direction is preferably smaller than the width Wt of the front end surface 29b of the main magnetic pole layer 29 in order to converge the magnetic field C. In the present invention, however, the width W1 of the bottom surface 33b1 of the projection 33b in the track-width direction may be larger than or equal to the width Wt of the front end surface 29b of the main magnetic pole layer 29.

A protective film that is composed of diamond-like carbon (DLC) and has a thickness of 15 to 70 Å may be formed on the front surface H1a facing the recording medium M.

What is claimed is:

1. A method for manufacturing a perpendicular magnetic recording head, comprising the following steps of:
   (a) forming a main magnetic pole layer from a magnetic material;
   (b) providing a first nonmagnetic layer on sides and a top surface of the main magnetic pole layer;
   (c) polishing a top surface of the first nonmagnetic layer to form a planarized surface;
   (d) trimming the top surfaces of the main magnetic pole layer and the first nonmagnetic layer by dry etching to form a groove defined by inner side surfaces of the first nonmagnetic layer and the top surface of the main magnetic pole layer;
   (e) depositing a nonmagnetic material layer on the first nonmagnetic layer and the main magnetic pole layer to form a recess of the nonmagnetic material layer on the groove; and
   (f) forming an auxiliary magnetic pole layer on the nonmagnetic material layer to form a projection in the recess, the projection being integrated with the auxiliary magnetic pole layer and extending toward the main magnetic pole layer.

2. The method for manufacturing a perpendicular magnetic recording head according to claim 1, further comprising a step of (g) forming a second nonmagnetic layer on the top and sides of the main magnetic pole layer between steps (a) and (b), wherein,
   at step (b), the first nonmagnetic layer is provided on sides and a top surface of the second nonmagnetic layer; and
   at step (d), the top surfaces of the main magnetic pole layer, the second nonmagnetic layer, and the first nonmagnetic layer are trimmed by dry etching so that the top surfaces of the second nonmagnetic layer are disposed below the top surfaces of the first nonmagnetic layer.

3. The method for manufacturing a perpendicular magnetic recording head according to claim 2, wherein an etching rate of the second nonmagnetic layer is higher than that of the first nonmagnetic layer under the same etching conditions.

4. The method for manufacturing a perpendicular magnetic recording head according to claim 2, wherein a etching rates of the second nonmagnetic layer and the main magnetic pole layer are higher than that of the first nonmagnetic layer under the same etching conditions.

5. The method for manufacturing a perpendicular magnetic recording head according to claim 2, wherein
   the first nonmagnetic layer is composed of alumina ($Al_2O_3$); and
   the second nonmagnetic layer is composed of at least one material selected from the group consisting of Ti, W, Cr, Ta, Mo, Au, Pd, Pt, Ni—Cr, Ni—Cu, Al—Si—O, silicon oxides, titanium oxides, tungsten oxides, chromium oxides, and tantalum oxides.

6. The method for manufacturing a perpendicular magnetic recording head according to claim 2, wherein
   the first nonmagnetic layer is composed of at least one of $SiO_2$ and Al—Si—O; and
   the second nonmagnetic layer is composed of at least one material selected from the group consisting of W, $WO_3$, Cr, CrOX, and Mo.

* * * * *